United States Patent
Hunter et al.

[11] Patent Number: 6,097,604
[45] Date of Patent: Aug. 1, 2000

[54] CARRIER TO FACILITATE INSTALLATION OF AN ELECTRONIC DEVICE INTO AN ENCLOSURE

[75] Inventors: Charles L Hunter; Lawrence N Taugher, both of Loveland, Colo.

[73] Assignee: Hewlett-Packard Company, Palo Alto, Calif.

[21] Appl. No.: 09/219,949

[22] Filed: Dec. 23, 1998

[51] Int. Cl.[7] .................................................. G06F 1/16
[52] U.S. Cl. ........................ 361/727; 361/679; 248/634
[58] Field of Search ................................... 361/727, 679, 361/634, 636, 638, 632, 633; 248/633, 632, 560; 211/1.3, 71.01, 126.1, 120; 220/4.02, 543, 559, 555

[56] References Cited

U.S. PATENT DOCUMENTS

| | | | |
|---|---|---|---|
| 4,894,792 | 1/1990 | Mitchell et al. | 364/708 |
| 4,941,841 | 7/1990 | Darden et al. | 439/377 |
| 4,982,303 | 1/1991 | Krenz | 360/137 |
| 5,003,431 | 3/1991 | Imsdahl | 361/415 |
| 5,195,022 | 3/1993 | Hoppal et al. | 361/391 |
| 5,269,698 | 12/1993 | Singer | 439/157 |
| 5,481,431 | 1/1996 | Siahpolo et al. | 361/685 |
| 5,566,383 | 10/1996 | Gildea et al. | 361/685 |
| 5,579,204 | 11/1996 | Nelson et al. | 361/685 |
| 5,680,293 | 10/1997 | McAnally et al. | 361/685 |
| 5,687,059 | 11/1997 | Hoppal | 361/685 |
| 5,726,922 | 3/1998 | Womble et al. | 364/708 |
| 5,768,099 | 6/1998 | Radloff et al. | 361/685 |

*Primary Examiner*—Leo P. Picard
*Assistant Examiner*—Yean-Hsi Chang
*Attorney, Agent, or Firm*—Augustus W. Winfield

[57] ABSTRACT

A carrier, for use in installing electronic devices, for example, computer peripherals, into an enclosure, includes an actuator. In a specific example embodiment, the actuator is a sliding cam plate. During insertion of the carrier into the enclosure, the cam plate extends beyond a cosmetic bezel of the electronic device. The carrier is inserted into an enclosure until the device bezel is flush with the front of the enclosure. Then, pushing the cam plate inward causes compressible pads on the sides of the carrier to be pushed outward, clamping the carrier to the sides of the enclosure. In addition, pushing the cam plate inward also causes metal surfaces to be pushed outward to contact the enclosure sidewalls for electrical grounding. Electronic devices preferably include an adapter cable. Cables internal to the enclosure are connected to the adapter cable, the adapter cable is connected to the electronic device, and an unconnected portion of the adapter cable is then available for installation of an additional electronic device.

3 Claims, 4 Drawing Sheets

CARRIER TO FACILITATE INSTALLATION OF AN ELECTRONIC DEVICE INTO AN ENCLOSURE

FIELD OF INVENTION

This invention relates generally to installation of electronic devices into enclosures (or housings or cases or chassis), for example, computer peripheral devices into computer enclosures, and more specifically to a carrier that facilitates installation.

BACKGROUND OF THE INVENTION

Installation of a peripheral device, such as a disk drive or tape drive, into a computer, often requires an installer to remove an exterior case from the computer. In addition, the installer often must locate a power cable, and an input/output (I/O) cable, within the computer, and to attach the cables to the peripheral device. Typically, a device is then attached to a metal computer chassis or frame using screws. This process is often intimidating to a novice operator, and can result in damage to either the computer or to the peripheral device being installed. Similarly, electronic instruments may be mounted into enclosed racks, audio and video equipment may be mounted into enclosed racks, and audio devices for automobiles may be mounted into enclosures.

One common approach to slide-in installation is to mechanically mount a device onto a separate module (or adapter, or carrier) and to electrically attach the device to a connector on the separate module. When the overall module is inserted into the enclosure, the separate module mechanically mates with compatible structures in the enclosure, and the connector on the separate module electrically mates with a compatible connector internal to the enclosure. See, for example, U.S. Pat. Nos. 4,894,792, 4,941,841, 5,195,022, 5,579,204 and 5,726,922. However, there is no industry standard for such an approach, and each approach requires a unique chassis or enclosure that is mechanically and electrically compatible with the separate module. Commercially available computer peripheral devices are still designed to be internally mounted into a computer enclosure using screws.

There is a continuing need for lower cost, simple, installation of electronic devices without requiring a unique chassis or enclosure, and without removal of an exterior case.

SUMMARY OF THE INVENTION

A device carrier in accordance with the invention includes an actuator. After insertion of the carrier into an enclosure, the actuator is used to clamp the carrier to sides of the enclosure. In a specific example embodiment, the actuator is a sliding cam plate. During insertion of the carrier into the enclosure, the cam plate extends beyond the cosmetic front bezel of the peripheral device. The carrier is inserted into an enclosure until a device bezel is flush with the front of the enclosure. Then, pushing the cam plate inward causes elastomeric (compressible) pads on the sides of the carrier to be pushed outward, clamping the carrier to the sides of the enclosure. In addition, pushing the cam plate inward also causes metal surfaces to be pushed outward to contact the enclosure sidewalls for electrical grounding, protection against electrostatic discharge, and additional holding capability.

For most computers, the present invention does not require any modification to metal parts of the computer chassis or drive bay that are intended for attachment of a peripheral device. The only requirement is that the computer chassis must have two rigid sidewalls for supporting the sides of the peripheral device. No screws are required for attaching the carrier to the enclosure.

A carrier in accordance with the invention does not include an electrical connector. Instead, unattached cables within the computer are temporarily secured in a spot that is easily accessible when a bezel is removed from the enclosure. For example, the cables may be secured to a removable bezel. The device being installed comes with an adapter cable. When a device is installed, two enclosure bezels are removed (if an additional device slot in the enclosure is available). The cables internal to the enclosure are attached to the adapter cable and the adapter cable is attached to the device. The adapter cable then has an unattached portion that is secured in an empty device slot or to the second enclosure bezel. When the device is inserted into the enclosure, the cables from inside the enclosure are carried into the enclosure, and the second enclosure bezel is reattached. If the enclosure does not have any empty device slots, the enclosure cables may be attached directly to the device and the adapter cable may be discarded.

DETAILED DESCRIPTION OF THE PREFERRED EMBODIMENT OF THE INVENTION

Figure 1:
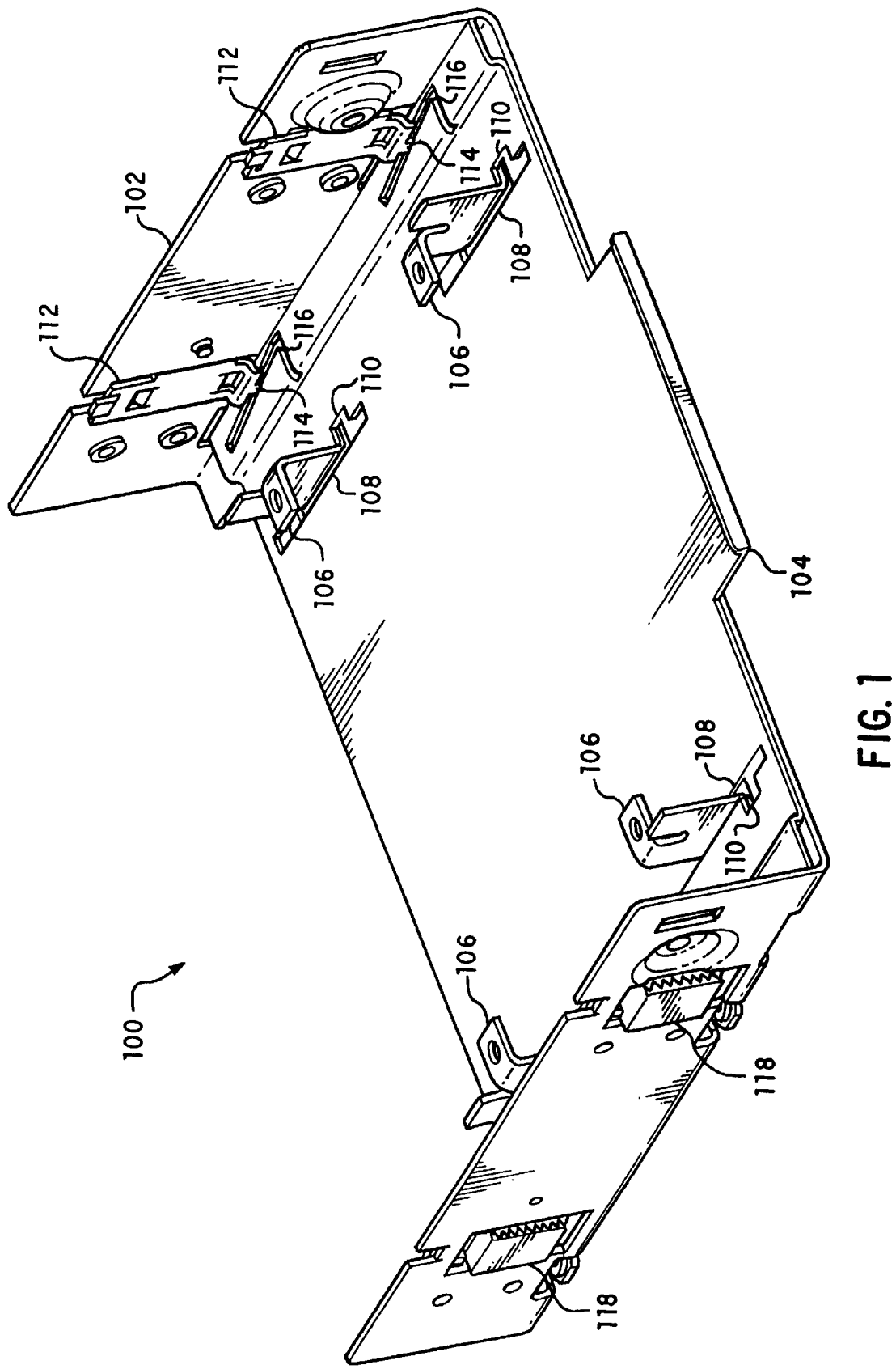
FIG. 1, is a perspective view of a carrier in accordance with the invention.
Figure 2:
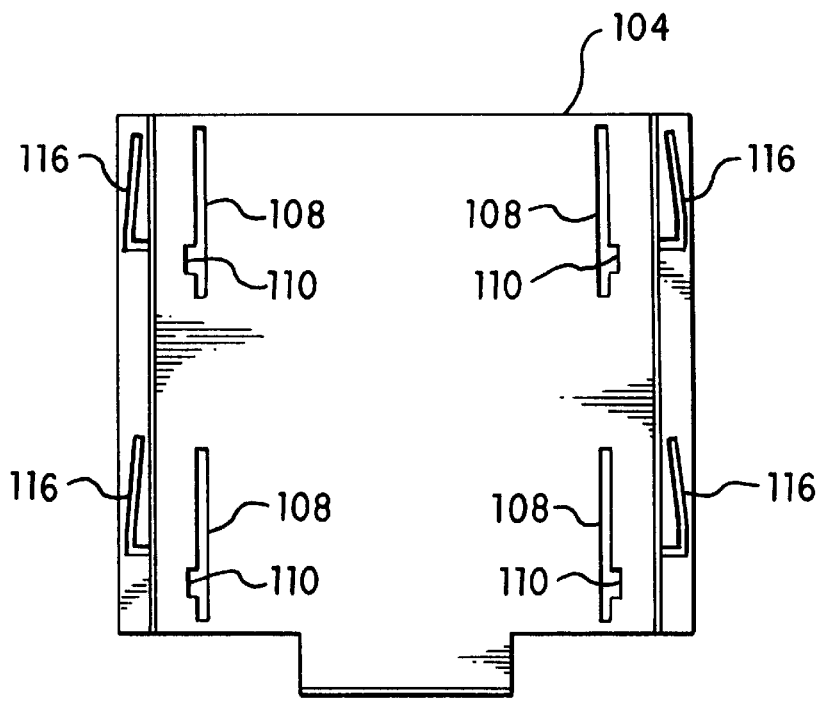
FIG. 2 is a top plan view of a cam plate.

FIG. 1 illustrates an example embodiment of a carrier in accordance with the invention. In the embodiment illustrated in FIG. 1, a carrier 100 has a tray 102 and a cam plate 104. Cam plate 104 is shown separately in FIG. 2. In FIG. 1, the tray 102 includes four tabs 106, each tab having a portion that is bent at ninety degrees, for attaching a computer peripheral device to the tray (using screws). Each tab extends through a tab slot 108 in the cam plate 104. Each tab slot 108 has a wide portion 110 that permits the bent tabs 106 to pass through the cam plate 104 for assembly. The wide portion 110 also provides access for a screwdriver to enable attachment of the peripheral device to the tabs 106 after the tabs 106 have been passed through the cam plate 104. The carrier 100 also includes brackets 112 mounted on each side of the tray. The brackets 112 are shown separately in FIG. 3. In FIG. 1, each bracket 112 is hinged at the top via a simple slot and tab arrangement, and each bracket has a tab 114, extending into a cam slot 116 in the cam plate 104. The carrier 100 also includes elastomeric (compressible) pads 118, each pad 118 attached to a bracket 112. Preferably, there are at least two pads on each side of the carrier.

Computers typically have a metal chassis or drive bay that has rigid sides for attaching a peripheral device (using screws). Computers typically have a peripheral device bay that is covered by removable plastic bezels. When a peripheral device is installed, a plastic bezel is removed from the computer case, and the newly installed device typically includes a plastic cosmetic bezel that fits in the location where a computer bezel was earlier removed.

In operation, the carrier 100 is inserted into the drive bay of a computer, with the cam plate 104 initially extending beyond the front bezel of the attached peripheral device. When the front bezel of the peripheral device is flush with the computer housing, the cam plate 104 is pushed into the tray 102 until the cam plate is flush with the front bezel of the peripheral device. When the cam plate 104 is pushed inward, the cam slots 116 on the cam plate force the tabs 114 on the brackets 112 outward, forcing the elastomeric pads 118 against the sides of the drive bay of the computer. The peripheral device is then clamped in place by the force of the elastomeric pads against the sides of the drive bay of the computer. For removal, the cam plate 104 is pulled out from the tray 102, releasing the force on the elastomeric pads 118, and freeing the carrier and the peripheral device for removal.

Figure 3:
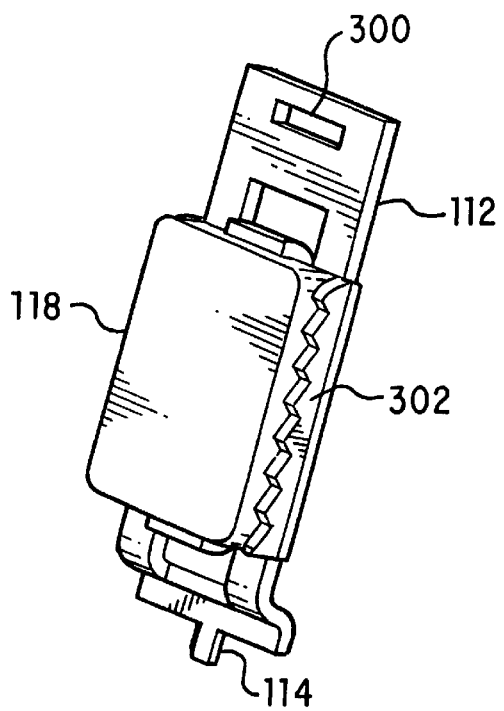
FIG. 3 is a perspective view of a bracket and attached carrier pad.

FIG. 3 further illustrates the brackets 112 and elastomeric pads 118. In FIG. 3, a simple slot 300 is used for a hinge arrangement with a matching tab on the side of the tray. Preferably, the brackets and elastomeric pads include a serrated metal portion 302 that is conductively connected to the bracket and thus to the tray. When the elastomeric pads 118 make initial contact with the computer housing, the serrated metal portion 302 is not in contact. As the elastomeric pads are compressed, the serrated metal portions 302 contact the side walls of the computer housing to provide grounding and electrostatic discharge protection. If for some reason the computer chassis does not provide a ground potential, a ground wire to the peripheral device may be required in addition to the standard power and signal cables.

Figure 4A:
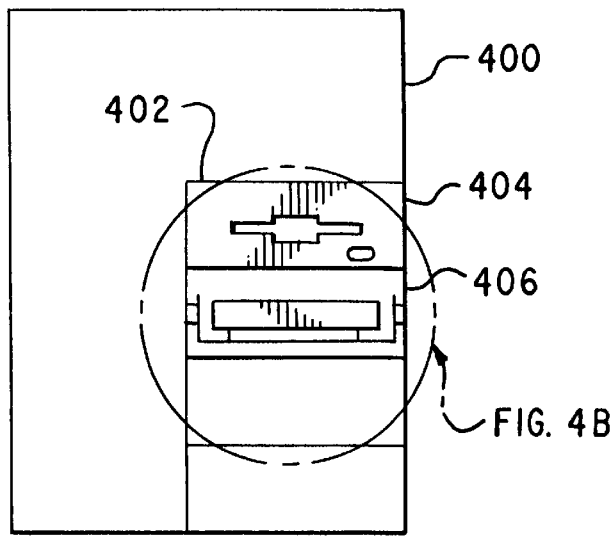
FIG. 4A is a simplified front view of the carrier of FIG. 1, with an attached peripheral device, mounted into a computer peripheral device bay (with bezel removed to facilitate illustration).
Figure 4B:
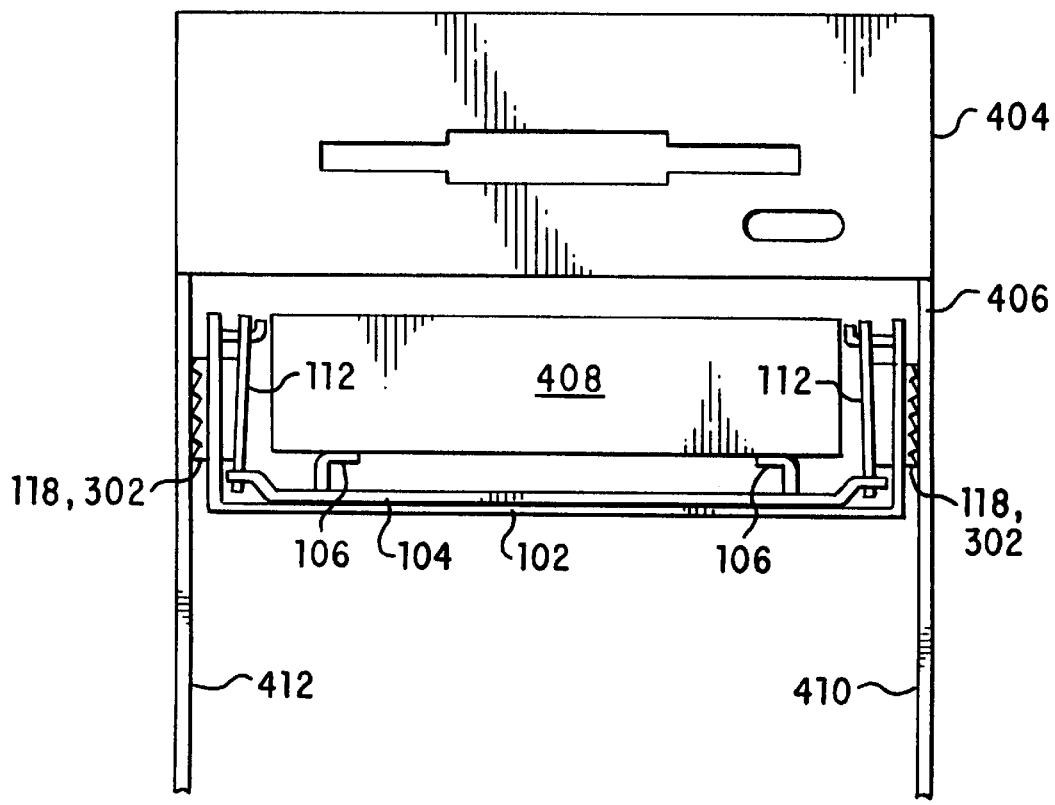
FIG. 4B is an expanded view of part of FIG. 4A.

FIG. 4A illustrates a computer 400 having a peripheral device bay 402 capable of holding up to four peripheral devices of a standard height. One peripheral device 404 is installed with an attached bezel. A second peripheral device has been attached in the drive bay in a second peripheral device slot 406 in accordance with the invention. As illustrated in further detail in FIG. 4B, a peripheral device 408 is attached to the carrier 100, which in turn is clamped against side walls 410 and 412 of the computer peripheral device bay. Note in particular that the elastomeric pads 118 have been compressed sufficient to enable the serrated metal portions 302 to contact side walls 410 and 412.

One goal of the present invention is to provide a carrier that works with commonly available peripheral device bays, without requiring any special adapters or connectors in the host computer. Accordingly, a carrier in accordance with the invention preferably does not include an electrical connector attached to the carrier for connecting to a mating connector in the computer. Instead, the peripheral device being installed comes with an adapter cable. Unattached cables (for example, power and signal cables) within the computer are temporarily secured in a spot that is easily accessible when a bezel is removed from the peripheral device bay of the computer. For example, the cables may be secured to a removable bezel using a spring clip. Alternatively, the cables may be simply taped to one of the walls of the peripheral device bay. The only requirement is that the unattached cables should be readily accessible when a bezel is removed from the peripheral device bay.

Figure 5A:
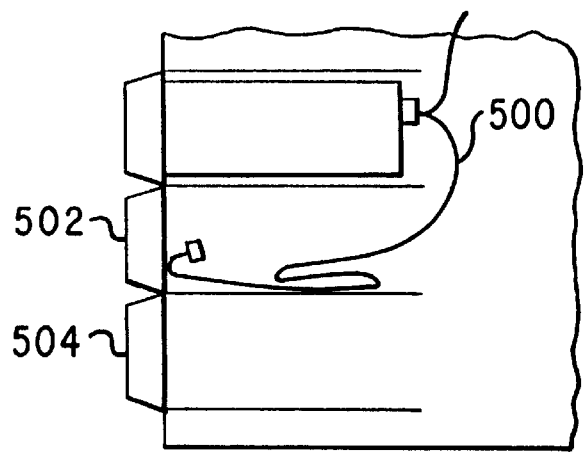
FIG. 5A is a cross-section side view of a computer illustrating a preferred arrangement of cables for use with the invention.
Figure 5B:
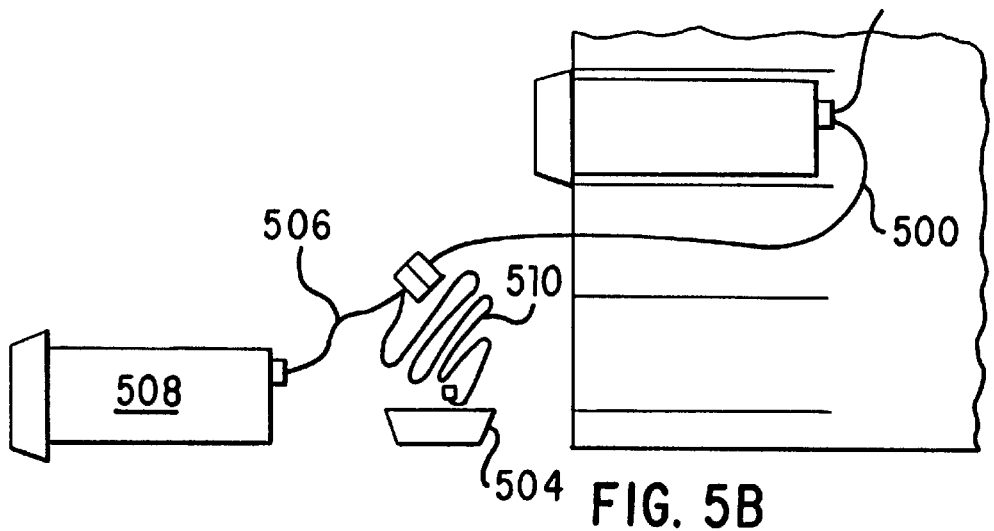
FIG. 5B is the computer of FIG. 5A, illustrating two removed bezels and a peripheral device ready for insertion.
Figure 5C:
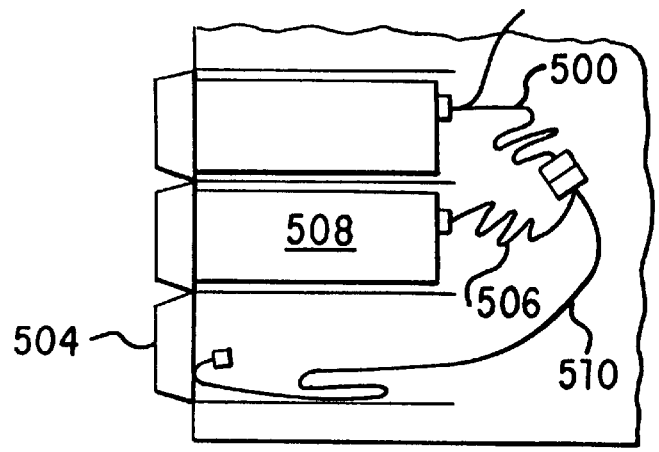
FIG. 5C is the computer of FIGS. 5A and 5B with a newly installed peripheral device.

FIG. 5A illustrates a computer peripheral device bay with an unattached internal cable 500 secured to a bezel 502 covering an empty device slot. An additional empty device slot is covered by a bezel 504. When a peripheral device is installed in accordance with the invention, two computer bezels are removed (if an additional peripheral device slot in the computer is available). In the computer illustrated in FIG. 5A, two device slots are available, so bezels 502 and 504 are both removed, as illustrated in FIG. 5B. Bezel 502 may then be discarded. As illustrated in FIG. 5B, the unattached cable 500 internal to the computer is attached to an adapter cable 506 and the adapter cable 506 is attached to a peripheral device 508. The adapter cable 506 has a unattached part 510 that is secured (for example, taped) in an empty peripheral device slot or to the second computer bezel 504 (for example, taped or clipped). As illustrated in FIG. 5C, when the peripheral device 508 is inserted into the computer, the cable 500 from inside the computer is carried into the computer. The second computer bezel 504 is reattached to the computer. The unattached part 510 of adapter cable 506 is readily accessible for installation of an additional peripheral device in the empty peripheral device slot. If the computer does not have any empty peripheral device slots, the computer cable 500 may be attached directly to the peripheral device 508 and the adapter cable 506 may be discarded. Note that for simplicity of illustration, cable 500 in FIGS. 5A–5C is illustrated as a single cable. Typically, peripheral devices require a separate power cable, a separate signal cable, and sometimes additional cables such as audio cables. Cable 500 depicts all required cables in one bundle.

For most computers, the present invention does not require any modification to the metal parts of the computer chassis or drive bay that are intended for attachment of a peripheral device. The only requirement is that the computer chassis must have two rigid sidewalls for supporting the peripheral device. In addition, internal computer cables are preferably secured in an empty peripheral device bay for easy accessibility.

The present invention is particularly applicable to computer peripheral devices, but may be equally applicable to any modular device bays for electronic equipment, including for example, racks for electronic audio and video equipment, and electronic instrumentation racks. The carrier could also be used, for example, for a removable audio system in an automobile.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A carrier for an electronic device to be installed into an enclosure, the enclosure having rigid walls for attachment of electronic devices, the carrier comprising:

a tray, having two opposing sides, the electronic device attached to the tray;

at least two pads that are compressible, positioned at the sides of the tray;

an actuator, moveable relative to the tray, the actuator including cam surfaces contacting the pads; and when the carrier is positioned within the enclosure, movement of the actuator relative to the tray causes the cam surfaces to force the pads outward from the sides of the tray, compressing the pads against the rigid walls of the enclosure, thereby clamping the carrier to the enclosure.

2. The carrier of claim 1, the actuator further comprising a plate, the cam surfaces comprising slots in the plate.

3. The carrier of claim 2, further comprising:

brackets, one bracket for each pad, each bracket having a tab that travels in one of the slots in the plate, wherein movement of the plate relative to the tray causes brackets to move outward as the tabs move in the slots in the plate, each bracket in turn pushing a corresponding pad outward.

\* \* \* \* \*